United States Patent [19]

Sutherland

[11] Patent Number: 4,520,423
[45] Date of Patent: May 28, 1985

[54] TAMPERPROOF, MOISTURE PROOF READOUT ENCLOSURE

[75] Inventor: Ray Sutherland, Hopwood, Pa.

[73] Assignee: Rockwell International Corporation, Pittsburgh, Pa.

[21] Appl. No.: 436,255

[22] Filed: Oct. 25, 1982

[51] Int. Cl.³ .............................................. H02B 1/00
[52] U.S. Cl. .................................. 361/380; 361/364; 220/315; 220/323; 220/324
[58] Field of Search ............... 361/331, 334, 364, 366, 361/369, 371, 380, 395, 399; 220/323, 324, 315, 243, 249; 248/27; 174/48

[56] References Cited

U.S. PATENT DOCUMENTS

| | | | |
|---|---|---|---|
| 863,224 | 8/1907 | Sawin | 361/364 X |
| 2,794,155 | 5/1957 | Jones | 361/334 X |
| 3,011,098 | 11/1961 | Godley | 361/366 OR |
| 3,334,276 | 8/1967 | Bateman et al. | 361/369 |
| 3,599,047 | 8/1971 | Magarian | 361/366 |
| 3,675,085 | 7/1972 | Stanback | 361/365 |
| 3,748,654 | 7/1973 | Sutherland | 174/48 |
| 4,331,012 | 5/1982 | Swisher | 361/369 X |

FOREIGN PATENT DOCUMENTS 24648 2/1980 Japan .................................. 361/369

*Primary Examiner*—A. D. Pellinen
*Assistant Examiner*—Greg Thompson

[57] ABSTRACT

A tamperproof, moisture proof data readout enclosure is comprised of a base plate adapted to be secured to a support structure and has channels formed in its rear surface. A cover adapted to be secured to the base plate has a sealing lip in its interior which cooperates with a seal on the base plate to provide a chamber within the enclosure which is sealed from the exterior environment when the cover is mounted on the base. The cover also has a peripherally extending wall which extends rearwardly from the front surface of the base plate and overlies the ends of the channels when the cover is secured in position. Openings are provided in the wall which register with the ends of the channels and locking pins are provided which project through the openings and the channels to prevent the removal of the cover from the base. Holes are provided on the locking pins to accommodate wires, the ends of which are sealed together to prevent removal of the locking pins without destruction of the integrity of the seal.

11 Claims, 5 Drawing Figures

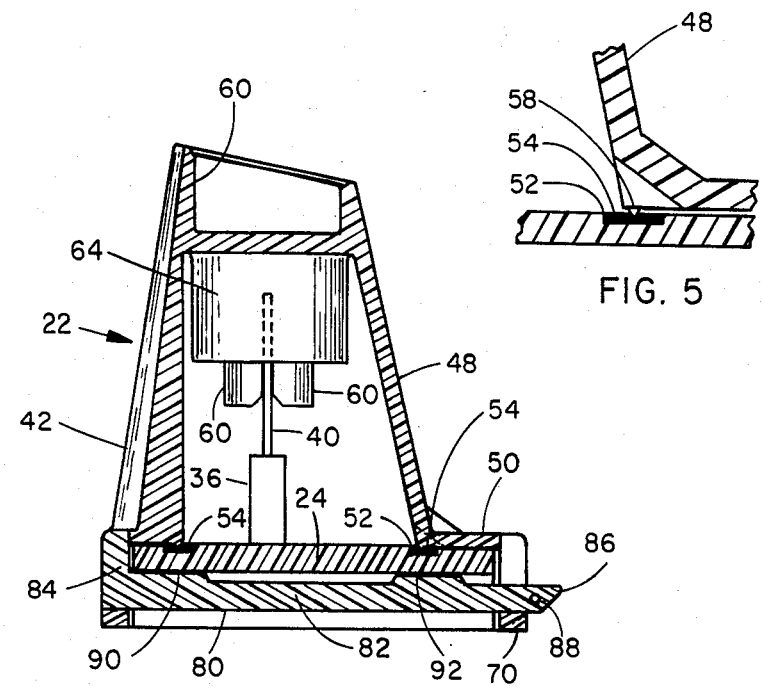
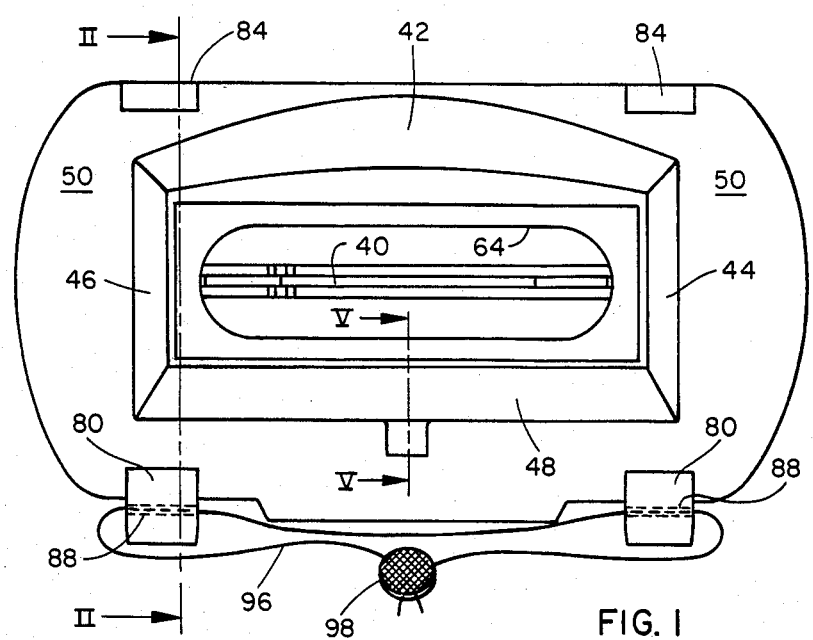

TAMPERPROOF, MOISTURE PROOF READOUT ENCLOSURE

BACKGROUND OF THE INVENTION

1. Field of the Invention

This invention relates to tamperproof and moisture proof enclosures for data readout devices which are located remote from a measuring device, such as utility meters which are usually located within the house, the readout device being located on an exterior wall of the house.

2. Description of the Prior Art

In northern latitudes it is customary to locate utility meters, particularly water meters, within the residence so as to render the meters unaffected by the prevailing climate. However, such a location for these meters presents problems to the utilities in obtaining the necessary periodic readings on the meter registers showing consumption of the water or other utility. Often the owners of the residence are not present when the meter reader is making his rounds or, in some cases, even when the residence is occupied, the occupant is reluctant to allow a stranger into the house. As a result, remote readout devices have been developed by various meter suppliers which are located exterior to the house but have an electrical or other connection with the meter located inside of the residence so that the meter reading is trasmitted from the meter to the remotely located readout device outside the residence.

One such system which is currently available on the market is shown in the U.S. Pat. No. 3,748,654 to Sutherland. In the system disclosed in that patent, the digital registration apparatus driven by the meter which is located within the residence produces a coded signal representative of water consumption which signal is transmitted to a circuit board which has output terminals adapted to be engaged by a receptacle in a portable readout gun carried by the meter reader. The meter reader is also provided with a data accumulating storage device to which the gun is electrically connected. After a removable cover is removed from the enclosure, the receptacle on the gun is inserted into the enclosure and engages the terminals on the circuit board. When the data accumulating device is energized, the reading at the meter is transferred from the meter through the readout station into the data accumulating device where it is accumulated and recorded by some well known convenient manner, such as tapes.

The enclosure disclosed in that patent is comprised of a base plate with a cover each of which have cooperating sealing means which provide a moisture proof chamber within the enclosure when the cover is on the base plate. It is necessary to prevent unauthorized access to the interior of the enclosure, otherwise the circuitry within the enclosure could be altered by some knowledgeable person to provide a spurious readout. In the enclosure shown in U.S. Pat. No. 3,748,654, the cover is secured to the base plate by means of four brass screws which are accessible from the exterior of the enclosure. A conventional means of preventing unauthorized access to the interior of the enclosure in such a design would be to provide holes in the screws through which a wire is passed, the ends of the wire being connected by a lead seal impressed thereon by the utility. Thus, removal of the cover would be impossible without affecting integrity of the seal.

While the cover and the base plate may be made of relatively inexpensive plastic material, such as a modified styrene based plastic, it is necessary that the screws be of some metallic material and preferably of brass to prevent corrosion. Such a means of securing the cover to the base plate is relatively expensive and, in order to to minimize the cost of producing and installing the enclosures while still maintaining security against unauthorized access to the interior, the instant invention provides an improved means for securing the cover to the base plate.

SUMMARY OF THE INVENTION

Accordingly, the improved means of securing the cover to the base plate is comprised of forming rearwardly facing vertically extending channels on the back surface of the base plate. The cover is then provided with a peripheral wall portion which overlies the ends of these channels when the cover is secured on the base plate and ports are provided in the peripheral wall which register with each end of the channels. Locking pins are then inserted through the openings in the wall of the cover and the channels. One end of the locking pins has an abutment which prevents them from being withdrawn or removed from the channels in one direction. The other end of the locking pins extend beyond the enclosure proper and are provided with holes through which a wire may be threaded, the ends of the wire then being sealed together with a conventional utility seal. Thus, the pins may not be withdrawn without destroying the seal and, therefore, unauthorized access to the interior of the enclosure is thereby prevented at minimum expense.

DESCRIPTION OF THE DRAWINGS

FIG. 1 is a front elevational view of an enclosure embodying the instant invention.

FIG. 2 is a sectional view taken along the line II—II of FIG. 1.

FIG. 5 shows the details of the seal arrangement between the boss and the cover of the enclosure.

DESCRIPTION OF THE PREFERRED EMBODIMENT

Figure 3:
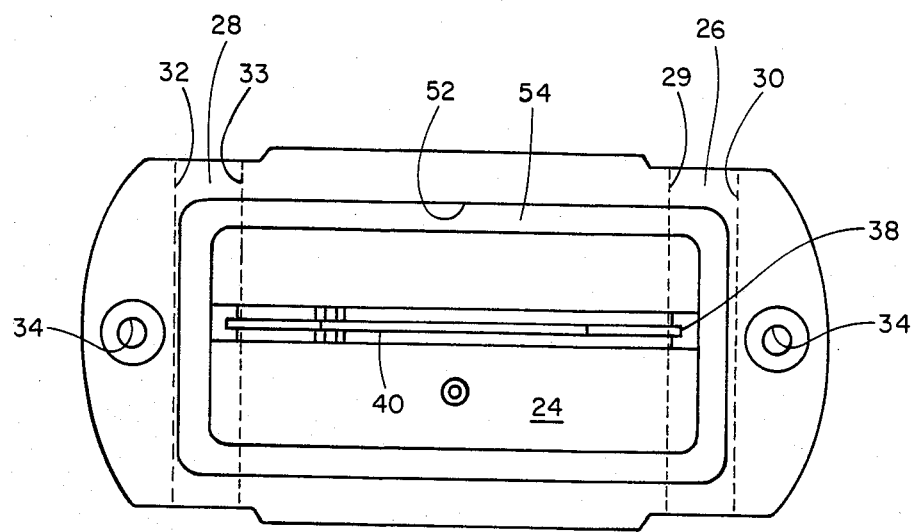
FIG. 3 is a front elevational view of the base of the enclosure of FIG. 1 with the cover removed.

Referring to the drawings, an enclosure embodying the instant invention is comprised of a base 20 and an cover 22 secured to the base in a manner to be described. The base is formed of a molded plastic material and has a laterally extending front wall 24. Two spaced rearwardly opening vertically extending channels 26 and 28 are formed between vertically extending and rearwarding projecting walls 29 and 30 and walls 32 and 33, respectively. Holes 34 are provided at opposite ends of the base 20 to receive bolts or screws for securing the base to any desired support structure such as the wall of a residence.

A U-shaped support bracket 36 is formed on the front wall 24 of the base and has a groove 38 for the reception of one end of a circuit board 40. The cover or housing 22 is formed of a top wall 42, two side walls 44 and 46 and a bottom wall 48, all of which converge from a rear wall 50 to form a chamber within the cover 22.

A rectangular groove 52 is formed in the front face of the base in circumscribing relationship to the support bracket 36. A deformable seal 54 made of elastomeric material is received in groove 52. The seal 54 sealingly engages a sealing lip 58 formed on the interior of the cover at the juncture of the walls 42, 44, 46 and 48 with wall 50. The sealing lip 58 is coextensive with the seal 54 and is placed in sealing engagement therewith when the cover is secured in place as hereinafter described.

At the outermost extremities of the walls 42-48 is formed an opening 60 for the reception of a closure member 62 for closing the chamber within the cover 22. An "O" ring 65 is received in a groove in a portion of the closure member which projects into the opening 60, the "O" ring having a slight interference fit with the wall surrounding the opening to hold the closure member in place and to provide a seal against leakage of moisture into the interior of the closure. Extending rearwardly from the opening 60 is a wall 64 at the rear edge of which at opposed points on the wall 64 project two pairs (only one pair shown) of oppositely spaced support clips 61 which support the front end of the circuit board 40 when the cover 22 is secured in position.

A wall 70 extends rearwardly from wall 50 at the rear portion of the cover and circumscribes the entire rear portion of the cover 22. Vertically aligned ports 72 and 74 formed in wall 70 register with opposite ends of the channel 26, and vertically aligned ports 76 and 78 in wall 70 register with the ends of channel 28 when the cover 22 is placed over the base 20 so that the wall 70 on the cover 22 circumscribes the periphery of the base 20. Thus, two passages passing completely through both the wall 70 of the cover and the base are provided for the reception of two identical locking pins 80.

Figure 4:
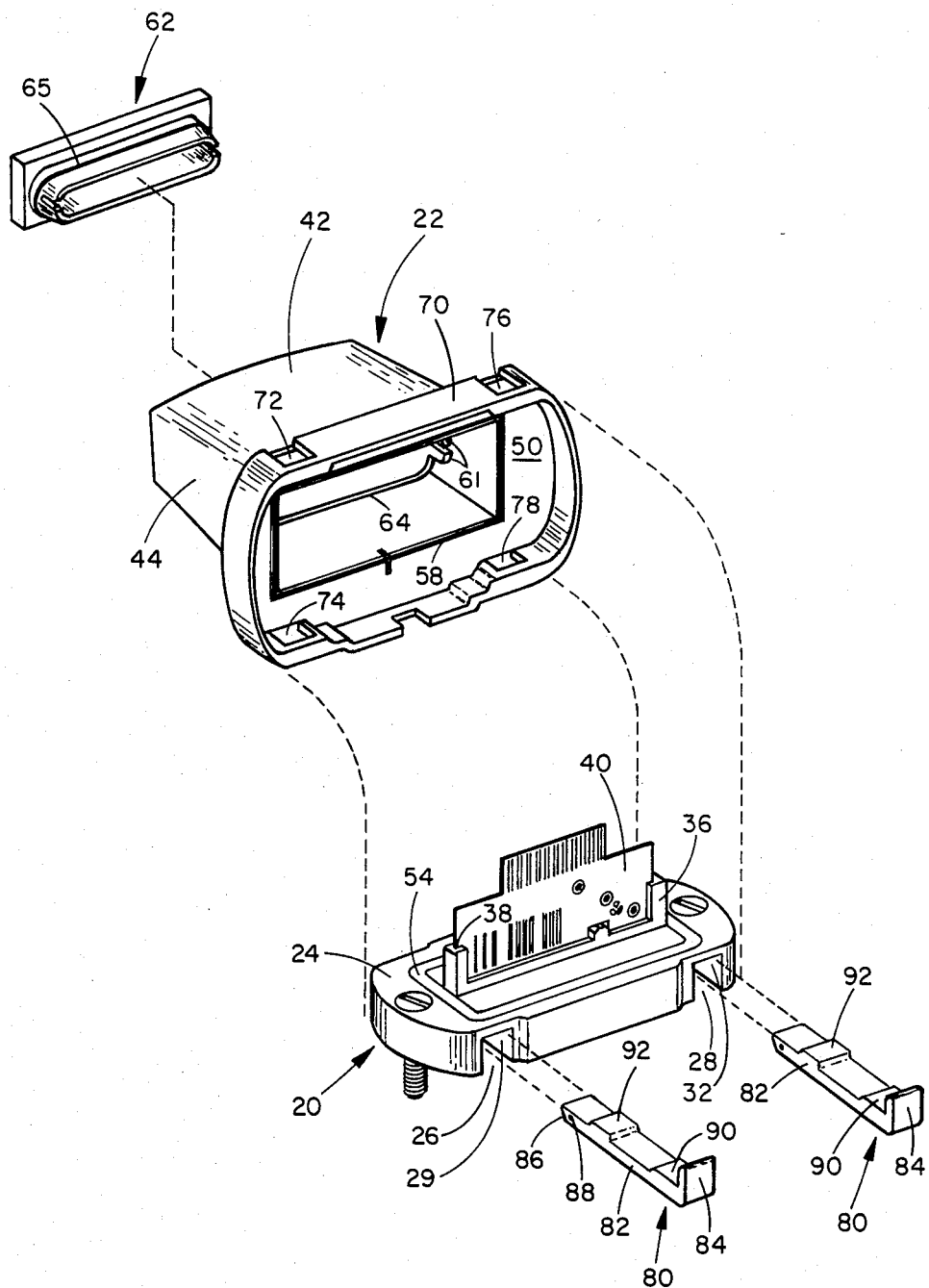
FIG. 4 is an exploded perspective drawing showing the various elements of the instant enclosure in disassembled relationship.

As shown in FIGS. 2 and 4, the locking pins 80 which may be of glass reinfoced acetal, are comprised of a elongated shank portion 82 of generally rectangular cross section and a laterally extending head portion 84 at one end. The opposite end of the shank portion 82 is beveled as shown at 86 and has a hole 88 extending through it. Pressure pads 90 and 92 are formed on the front surface of the leg portion 82 which bear up against the front wall of channels 26 and 28 when the locking pins are in the channels to provide a suitable sealing pressure between the sealing lip 58 and the seal 54.

To lock the enclosure on its supporting structure, the base 20 is first secured to the structure by means of bolts or screws passing through holes 34 at either side of the base. The rear end of the circuit board 40 is then inserted into the groove 38 formed in support bracket 36. The cover 22 is then placed over the base with the walls 70 closely circumscribing the peripheral wall of the base in which position the ports 72 and 74 and 76 and 78 are aligned with their respective channels 26 and 28. In this position, the support clips 61 engage the front portions of the circuit board to provide additional support for the board. The locking pins 80 are then inserted into passages provided by channels 26 and 28 and their aligned openings in the wall 70 of the cover. When the locking pins 80 are inserted into their respective channels, the camming action of the pressure pads 90 and 92 against the forward wall of the channels and the reaction of the rear surface of the pins against the edge of the openings 72-78 in effect urges the cover 22 toward the base 20 and thereby urges the sealing lip 58 into sealing engagement with the seal 54 thereby providing a chamber within the enclosure in which the circuit board 40 is supported. The tapered nose portion 80 of the pins facilitates inserting of the nose of the pin into these openings.

When the pins are inserted fully into the passages provided by the openings 72-78 and the channels 26 and 28, the nose or end portion of the pins 80 having the holes 88 will project outside of the enclosure beyond the lower run of wall 70 and the head portion 84 will be snugly received in the openings 72 and 76. However, the head portions 84 will overlie and abut against the front wall 24 on the base thereby preventing any further downward movement of the locking pins 80. A wire 96 may then be passed through the openings 88 in both pins and the ends of the wire sealed by a conventional utility seal 98, usually of lead, to prevent withdrawal of the pins in the upward direction. Thus, removal of the cover and access to the interior of the enclosure is prevented without cutting the wire or destroying the seal securing the ends of the wire.

When it is desired to obtain a reading from the meter to which the circuit board is electrically connected, the closure member 62 is removed and a readout gun having a receptacle is inserted into the opening at the front end of the enclosure into engagement with the terminal portions of the circuit board 40. After the data has been transferred into the accumulation device carried by the meter reader, the readout gun is withdrawn and the cover replaced.

I claim:

1. A tamperproof enclosure for a data readout device comprised of a base having a front wall, spacer means projecting rearwardly from said front wall terminating in a plane spaced rearwardly from said front wall, a cover comprised of a main body portion and mounted on said base, peripheral wall means formed on said cover bridging at least a portion of the space between said plane and said front wall and terminating in a free edge, openings in said peripheral wall means communicating with the space between said plane and said front wall, locking pin means received through said openings into the space between said plane and said front wall to prevent removal of said cover from said base.

2. The enclosure defined in claim 1 in which the openings in said peripheral wall are spaced forwardly of said free edge of said peripheral wall whereby said openings are bounded by a portion of said peripheral wall rearwardly of said openings.

3. The enclosure defined in claim 2 in which said locking pin means is comprised of an elongated pin means having abutment means at one end which abuts against a portion of said enclosure to limit movement of said pin means into said space between said front wall and said plane.

4. The enclosure of claim 3 in which the other end of said pin means projects beyond said peripheral wall means, and means on said other end to receive sealing means adapted to prevent removal of said pin means from said space between said plane and said front wall without destroying the integrity of said sealing means.

5. The enclosure defined in claim 2 in which said base and said cover define a chamber within said cover, together with means to seal said chamber against ingress of moisture from the exterior of said enclosure comprised of a resilient sealing element on one of said cover and said base circumscribing said chamber in sealing contact with a sealing surface on the other of said base and said cover circumscribing said chamber.

6. The enclosure defined in claim 5 in which said pin means has cam surfaces which cooperate with said portion of said peripheral wall rearwardly of said openings and with said front wall to urge said sealing element and said sealing surface into moisture tight engagement.

7. The enclosure defined in claim 1 in which said spacer means is comprised of spaced walls extending between opposed points on the periphery of said front wall to define channel means the opposite ends of which register with respective ones of said openings in said peripheral wall.

8. The enclosure defined in claim 7 in which said channel means is comprised of two spaced channels each comprised of two spaced walls extending between opposed points in the periphery of said front wall.

9. The enclosure defined in claim 8 in which said pin means is comprised of two elongated locking pins each of which is received through respective ones of said openings in said peripheral wall means and into each of said channels.

10. The enclosure defined in claim 9 in which said pins have abutments at one end which abut against a portion of said enclosure to limit movement of said pins into said channels, the other end of said pins projecting beyond said peripheral wall means.

11. The enclosure defined in claim 10 together with means on said other end of said pins to receive sealing means adapted to prevent removal of said pins from said channels without destroying the integrity of said sealing means.

* * * * *